US012695827B2

(12) United States Patent
Jackson et al.

(10) Patent No.: US 12,695,827 B2
(45) Date of Patent: Jul. 28, 2026

(54) SYSTEM AND APPLICATION FOR SMARTPHONE RESTRICTIONS AND MONITORING

(71) Applicant: Cyber-Dive Corp., Mesa, AZ (US)

(72) Inventors: Derek Jackson, Phoenix, AZ (US); Harshini Kanukuntla, Tempe, AZ (US); Siddhesh Rao, Tempe, AZ (US); Narasimha Siva Saketh Emani, Mesa, AZ (US); Rashmi Atul Bongirwar, Phoenix, AZ (US); Kelli Jackson, Gilbert, AZ (US)

(73) Assignee: Cyber-Dive Corp, Mesa, AZ (US)

( * ) Notice: Subject to any disclaimer, the term of this patent is extended or adjusted under 35 U.S.C. 154(b) by 287 days.

(21) Appl. No.: 18/742,839

(22) Filed: Jun. 13, 2024

(65) Prior Publication Data

US 2024/0422258 A1     Dec. 19, 2024

Related U.S. Application Data

(60) Provisional application No. 63/521,081, filed on Jun. 14, 2023.

(51) Int. Cl.
| | |
|---|---|
| *H04M 1/72* | (2021.01) |
| *H04L 67/50* | (2022.01) |
| *H04M 1/72463* | (2021.01) |

(52) U.S. Cl.
CPC ...... *H04M 1/72463* (2021.01); *H04L 67/535* (2022.05)

(58) Field of Classification Search
CPC ......................... H04M 1/72463; H04L 67/535
USPC .......................................................... 455/419
See application file for complete search history.

(56) References Cited

U.S. PATENT DOCUMENTS

| | | | | |
|---|---|---|---|---|
| 2003/0028622 A1* | 2/2003 | Inoue | ................ | H04N 21/8355 |
| | | | | 709/219 |
| 2007/0264974 A1* | 11/2007 | Frank | .................... | H04W 4/021 |
| | | | | 455/411 |
| 2009/0055915 A1* | 2/2009 | Piliouras | ................ | G06F 21/41 |
| | | | | 726/8 |
| 2019/0230170 A1* | 7/2019 | Marlin | ................ | G06F 16/9535 |

\* cited by examiner

*Primary Examiner* — Joel Ajayi
(74) *Attorney, Agent, or Firm* — Christopher Pilling

(57) ABSTRACT

The present invention relates to a system and method for monitoring and restricting smartphone usage among children, enhancing parental oversight and mental health support. The system includes internet-connected central servers executing monitoring software from non-transitory media, paired with specialized child devices and generic parental devices. These devices facilitate real-time and recorded monitoring of smartphone activities, including application usage, screen time, and internet access. The child devices are equipped with customized operating systems and software that prevent bypassing parental controls. Parental devices can access detailed analytics and live streams of child device activity. The system also incorporates machine learning algorithms to trigger mental health checks based on application usage patterns. These checks involve interactive mental health questionnaires, mindfulness exercises, and emergency interventions, providing timely support tailored to the child's activities and mental state. This invention offers a comprehensive solution to digital parenting challenges.

14 Claims, 16 Drawing Sheets

Parent selects option "Request 3rd party help!" on parent dashboard 901

Parent selects therapist from their saved list? 902

Yes

Get therapist number from database 903

Using a messaging service, send message {childPhoneNumber, customMessage} to therapist 904

No

Get child phone number from database 905

Trigger a webhook to send message from child's phone 906

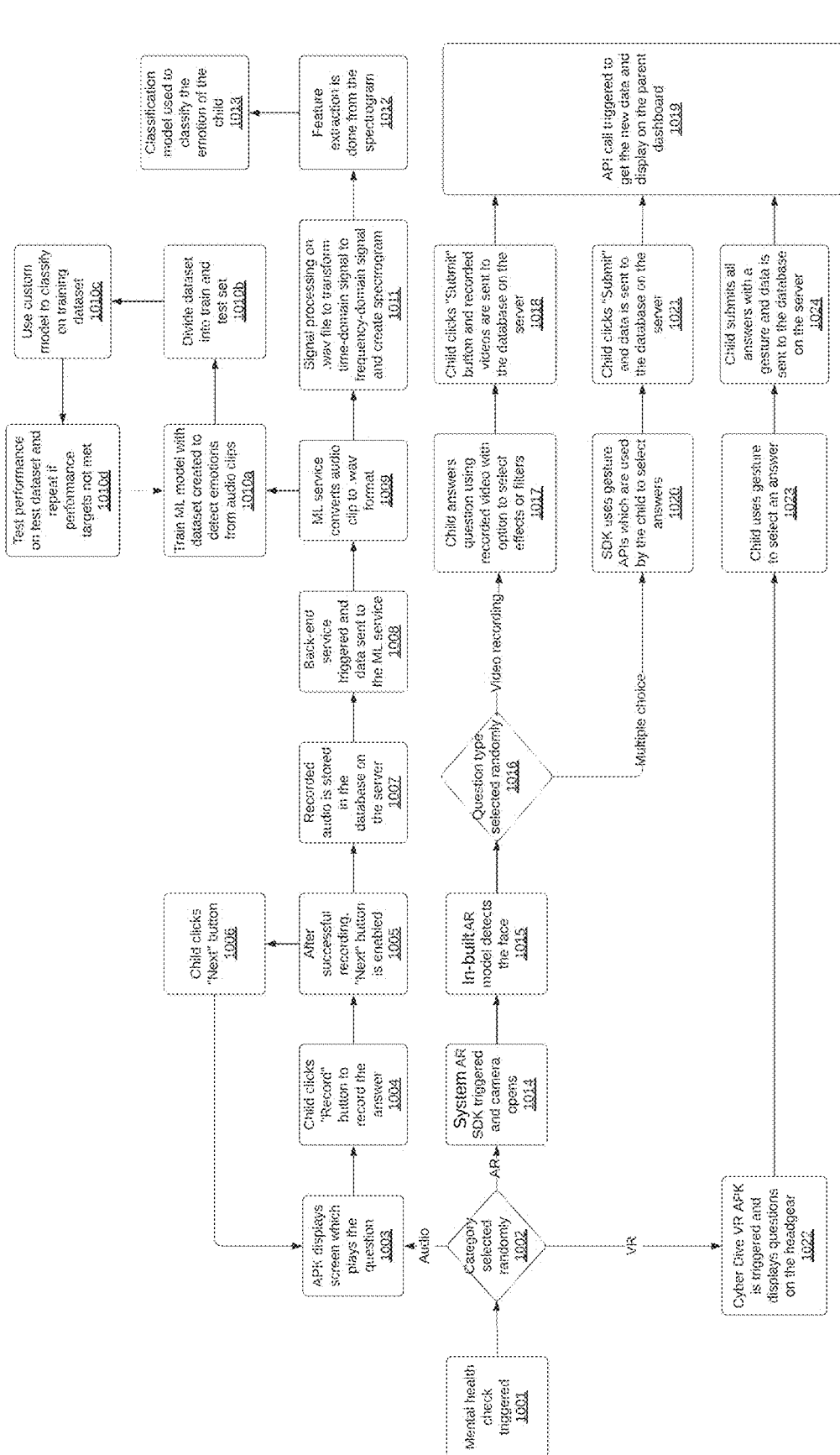

FIG. 10

Mental health check triggered 1001

Category selected randomly 1002

APK displays screen which plays the question 1003

Child clicks "Record" button to record the answer 1004

After successful recording, "Next" button is enabled 1005

Child clicks "Next" button 1006

Recorded audio is stored in the database on the server 1007

Back-end service triggered and data sent to the ML service 1008

ML service converts audio clip to .wav format 1009

Train ML model with dataset created to detect emotions from audio clips 1010a

Divide dataset into train and test set 1010b

Use custom model to classify on training dataset 1010c

Test performance on test dataset and repeat if performance targets not met 1010d Signal processing on .wav file to transform time-domain signal to frequency-domain signal and create spectrogram 1011

Feature extraction is done from the spectrogram 1012

Classification model used to classify the emotion of the child 1013

System AR SDK triggered and camera opens 1014

In-built AR model detects the face 1015

Question type selected randomly 1016

Child answers question using recorded video with option to select effects or filters 1017

Child clicks "Submit" button and recorded videos are sent to the database on the server 1018

API call triggered to get the new data and display on the parent dashboard 1019

SDK uses gesture APIs which are used by the child to select answers 1020

Child clicks "Submit" and the database is sent to the database on the server 1021

Cyber Dive VR AFK is triggered and displays questions on the headgear 1022

Child uses gesture to select an answer 1023

Child submits all answers with a gesture and data is sent to the database on the server 1024

SYSTEM AND APPLICATION FOR SMARTPHONE RESTRICTIONS AND MONITORING

CROSS-REFERENCE TO RELATED APPLICATIONS

The present invention claims priority to Provisional Patent Application Ser. No. 63/521,081 filed Jun. 14, 2023, which is hereby incorporated in its entirety at least by reference.

BACKGROUND OF THE INVENTION

1. Field of the Invention

The present invention relates to smartphones but more particularly to a system and method for smartphone restrictions and monitoring.

2. Description of Related Art

With the proliferation of mobile technology, smartphones have become ubiquitous in the daily lives of individuals, including children. These devices offer numerous benefits such as communication, education, and entertainment. However, they also pose significant challenges and risks, particularly for young users. These risks include exposure to inappropriate content, cyberbullying, and unsupervised communication with strangers.

Current technologies aimed at monitoring and controlling a child's use of smartphones are varied but often fall short in several key areas. Parental control applications exist that allow for the monitoring of calls, texts, and application usage, and some can restrict access to certain functions based on time or content ratings. However, these solutions often require significant configuration efforts from parents, can be easily bypassed by tech-savvy children, and may not offer comprehensive coverage across different types of smartphone activities. Consequently, a solution is provided.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is an object of the present invention to provide a comprehensive system for monitoring and restricting smartphone usage among children that enhances safety and promotes responsible usage through advanced technology and software.

It is another object of the present invention to provide real-time and historical monitoring capabilities that allow parents, mental health professionals, and, when necessary, law enforcement to access data securely for safeguarding child users.

It is yet another object of the present invention to provide a method for enhancing the security and functionality of child devices through custom software that overrides standard system libraries, thereby ensuring controlled application usage and preventing unauthorized access.

It is a further object of the present invention to provide an innovative approach to mental health monitoring by integrating machine learning algorithms that analyze usage patterns to trigger mental health checks and detect potential risks such as grooming or imminent danger scenarios.

It is still another object of the present invention to employ edge computing within child devices to perform real-time data processing, reducing latency and enhancing the responsiveness of monitoring and intervention measures.

In order to do so, in one aspect of the invention, a method for monitoring smartphone usage among children is provided, comprising providing a specialized child device with a pre-installed operating system and monitoring software; securely transmitting data from the child device to a central server using encrypted communication protocols; analyzing the transmitted data on the central server to identify usage patterns; generating notifications based on the analyzed usage patterns; sending the notifications to a parental device; and enabling the parental device to access and review the notifications and activity data of the child device through a parental dashboard configured on the parental device.

In one embodiment, the method wherein the transmitting data includes information selected from the group consisting of application usage data, call data, message data, and internet browsing data. In another embodiment, the method wherein the analyzing step includes the use of a machine learning algorithm to determine the usage patterns. In yet another embodiment, the method further comprises triggering a mental health check based on the analyzed usage patterns. In one embodiment, the method wherein the mental health check includes sending a questionnaire to the child device. In another embodiment, the method wherein the questionnaire is adapted based on the child's recent activity as determined by the machine learning algorithm.

In yet another embodiment, the method further comprises the step of live streaming the display of the child device to the parental device. In one embodiment, the method wherein the notifications are based on predetermined criteria including at least one of: time spent on applications, inappropriate content access, and time of device usage. In another embodiment, the method further comprises a mental health professional device configured to receive specific alerts and data related to mental health checks from the central server. In yet another embodiment, the method wherein all streaming data is stored in a categorized database on the central server for non-real-time access by the parental or mental health professional device. In one embodiment, the method further comprises a mechanism for law enforcement first responders to access data and receive alerts from the central server when a predetermined danger threshold is exceeded. In another embodiment, the method wherein the child device transmits all inputs and outputs, including underlying data and network calls, to the central server when an application is opened on the child device.

In yet another embodiment, the method employs a custom library model, loaded as a shared library (SO) file, within the operating system of the child device to intercept and log all inputs, outputs, and system calls made by applications; creating virtual system functions that mirror actual system shared library functions for real-time tracking of application behavior; and detecting application launches and closures by monitoring the application's execution state, and logging these events along with associated data traffic and system call activities to provide detailed insights into application usage patterns.

In one embodiment, the method includes a feature for detecting grooming patterns based on the stored data using a machine learning model, and alerting the parental device. In another embodiment, the method wherein the logged data is analyzed using a machine learning model configured to identify specific behavioral patterns and indicators of grooming; applying natural language processing (NLP) techniques to the content within the communications and interactions logged from the child device to enhance detection accuracy; automatically updating the machine learning model based on new data inputs to refine the pattern recognition process over time; and generating and transmitting alerts to the parental device when potential grooming behavior is detected, including detailed information on the context and nature of the detected activity to assist in timely and appropriate responses.

In another aspect of the invention, a system for monitoring and restricting smartphone usage among children is provided, comprising a specialized child device equipped with a customized operating system and monitoring software; a central server configured to receive data from the child device and analyze the data to identify usage patterns; and a parental device and a mental health professional device, each configured to receive notifications from the central server based on the identified usage patterns.

In one embodiment, the system wherein the central server includes a data repository for storing historical usage data of the child device, accessible by the parental and mental health professional devices for review and analysis. In one embodiment, the system wherein both the parental and mental health professional devices are generic smartphone devices capable of configuring to communicate with the central server and customized to access a specialized dashboard for monitoring. In another embodiment, the system wherein the machine learning algorithm operates to adjust the monitoring based on a continuous learning model from the child's usage data, with feedback mechanisms that allow the parental and mental health professional devices to contribute to the learning model. In yet another embodiment, a Photonic Integrated Circuit (PIC) edge device is implemented within the system.

The foregoing has outlined rather broadly the more pertinent and important features of the present disclosure so that the detailed description of the invention that follows may be better understood and so that the present contribution to the art can be more fully appreciated. Additional features of the invention, which will be described hereinafter, form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL
VIEWS OF THE DRAWINGS

Other features and advantages of the present invention will become apparent when the following detailed description is read in conjunction with the accompanying drawings, in which.

Figure 4A:
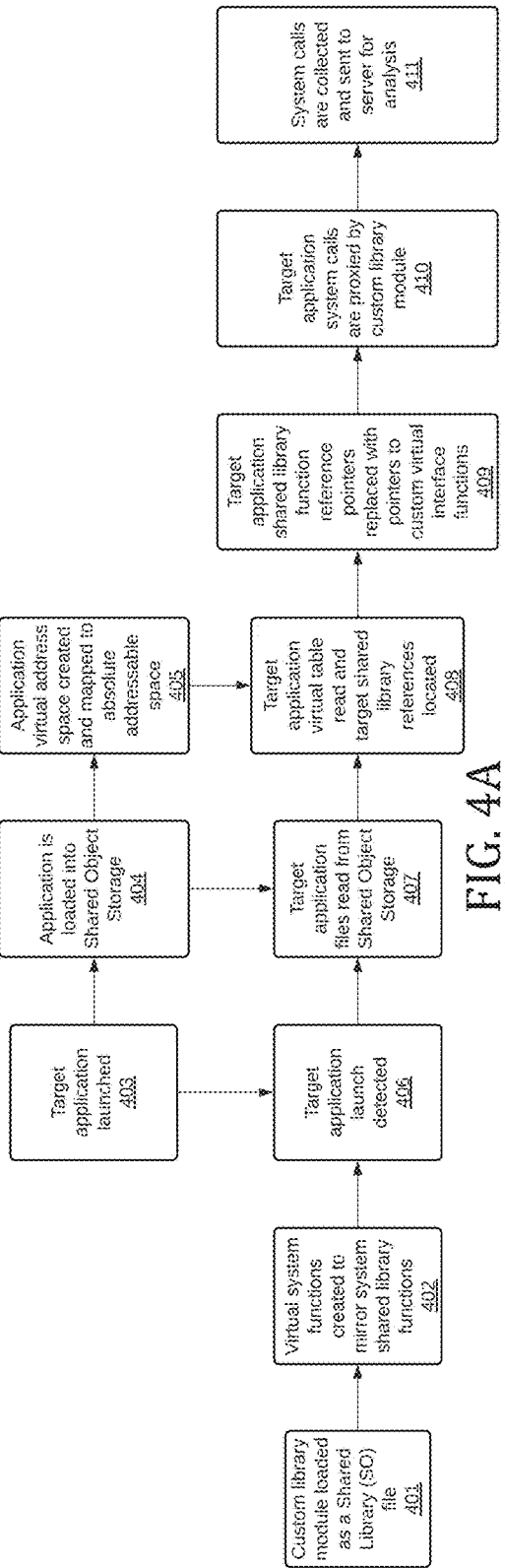
Figure 4B:
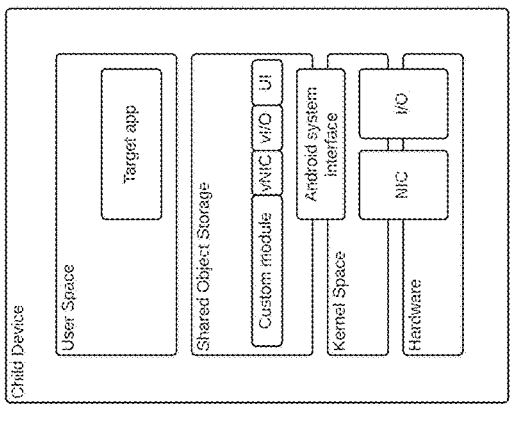

FIGS. 4A-B illustrates a system diagram outlining a method for overriding Android system library calls when an application is launched on a child device according to an embodiment of the invention.

Figure 5A:
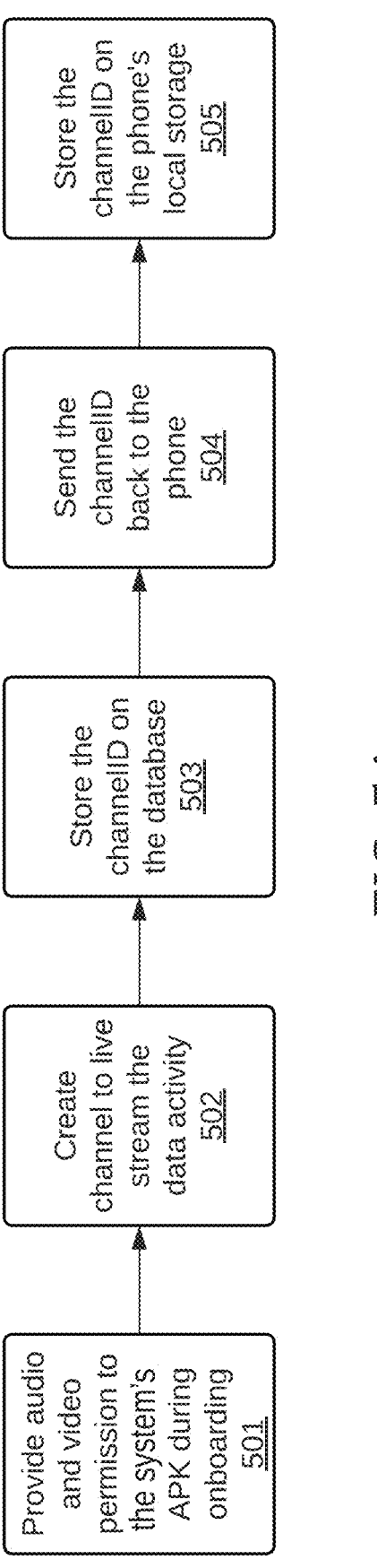
Figure 5B:
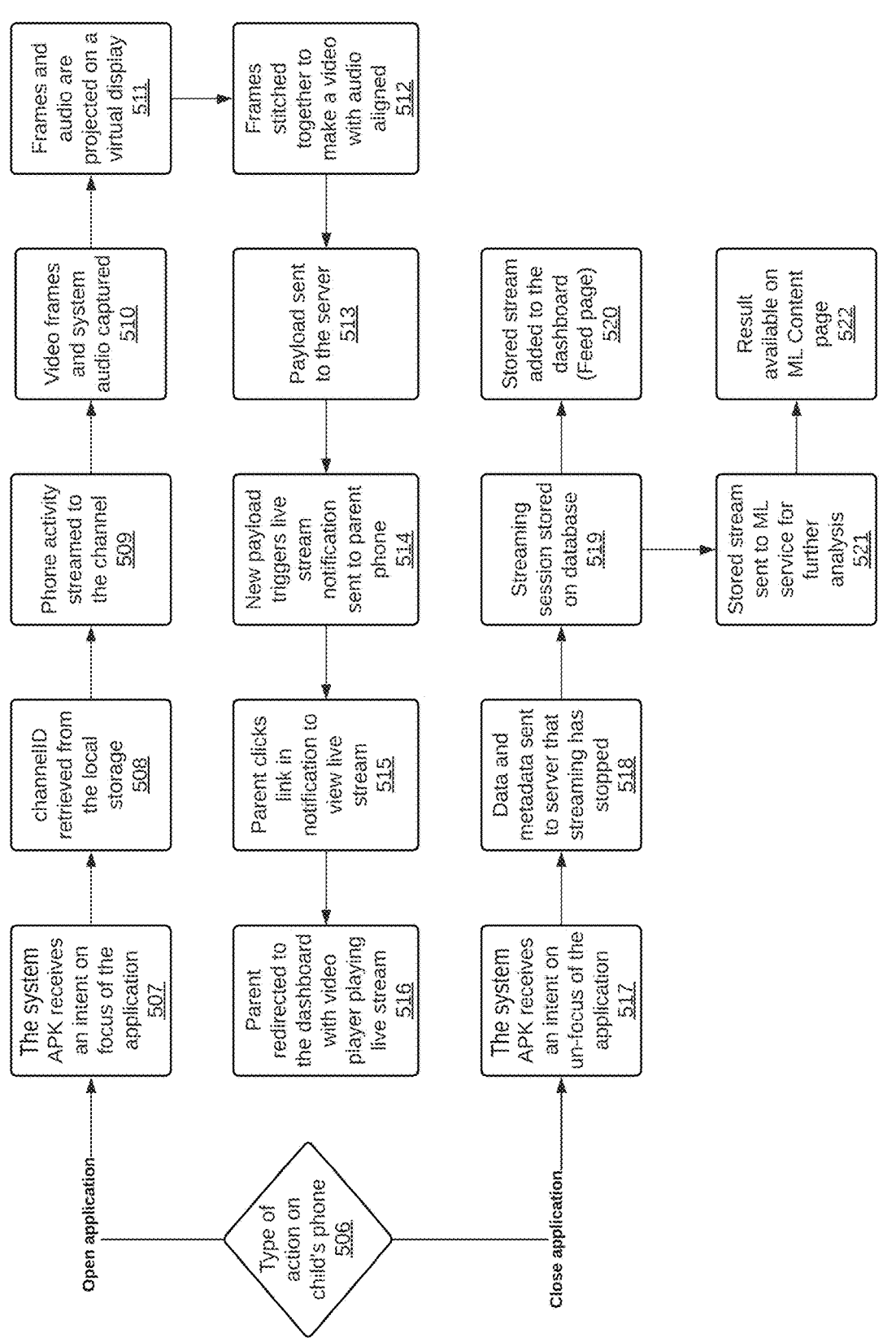

FIGS. 5A-B illustrate a system diagram for a method for child device activity data monitoring according to an embodiment of the present invention.

Figure 6A:
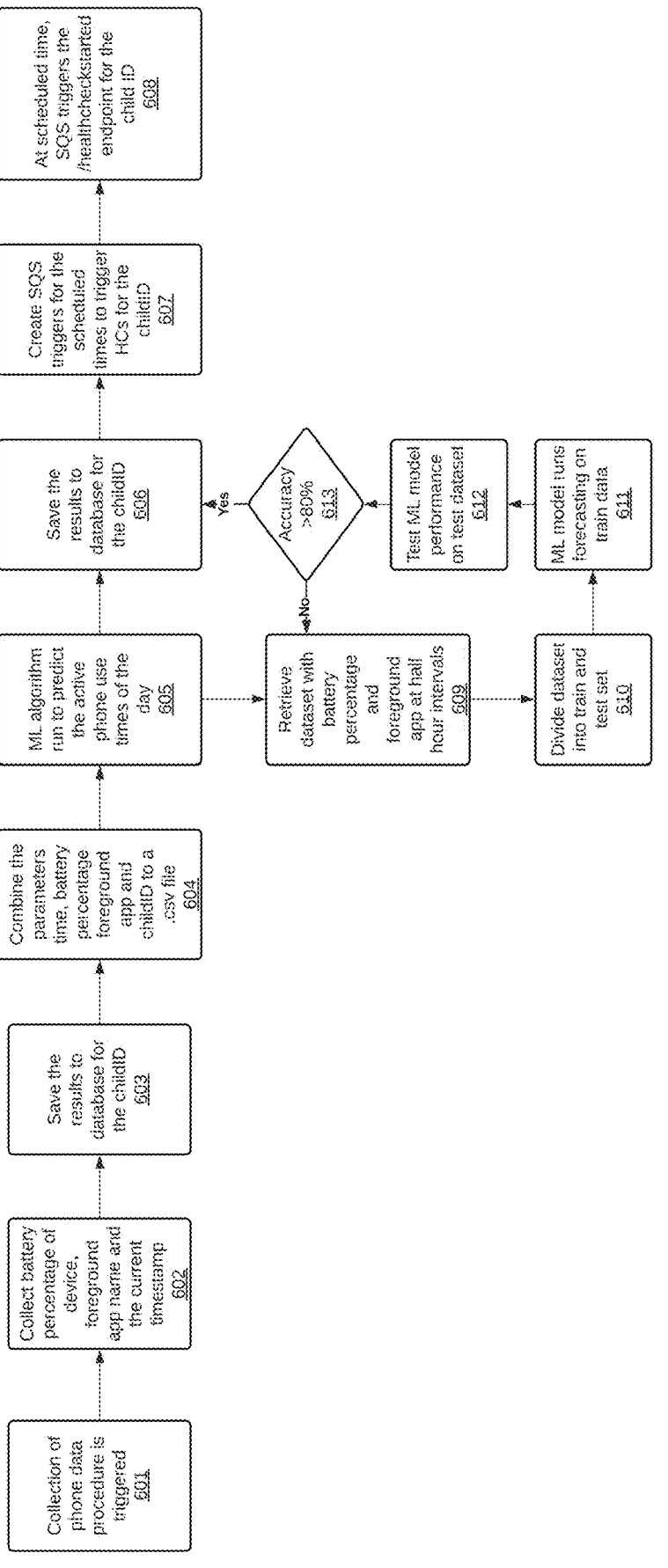
Figure 6B:
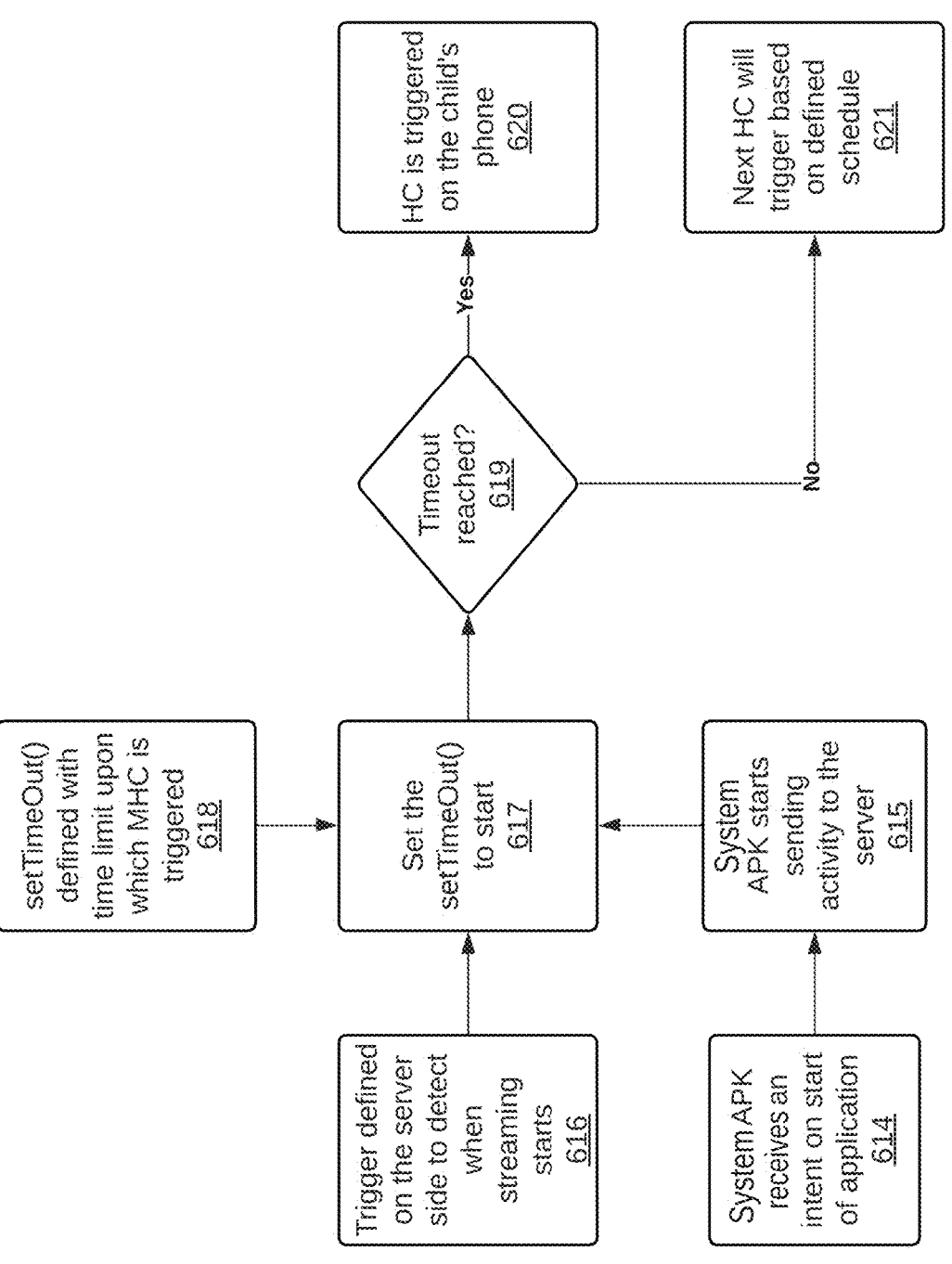

FIGS. 6A-B illustrate a system diagram for a method for triggering a mental health check via a machine learning algorithm according to an embodiment of the present invention.

Figure 7A:
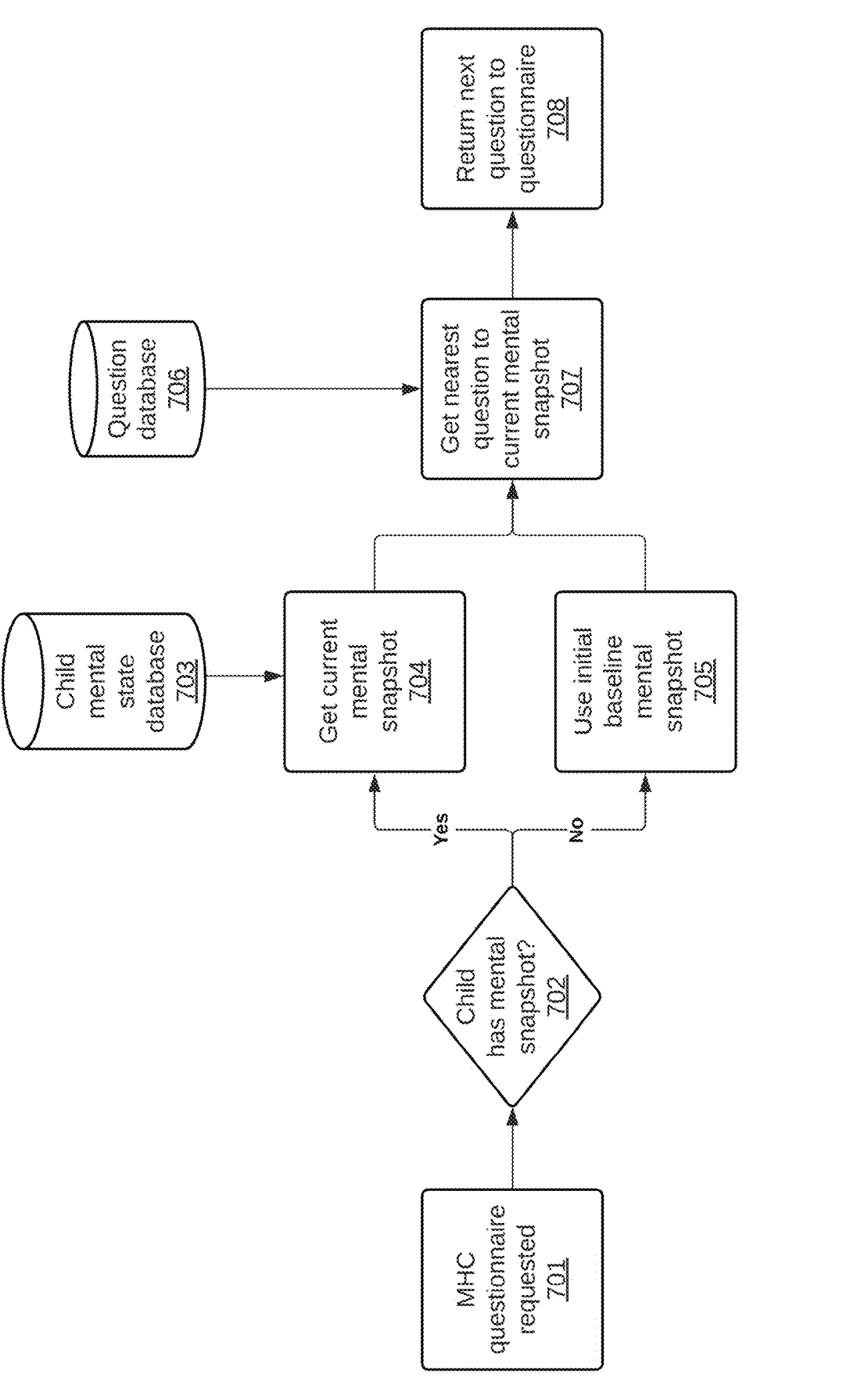
Figure 7B:
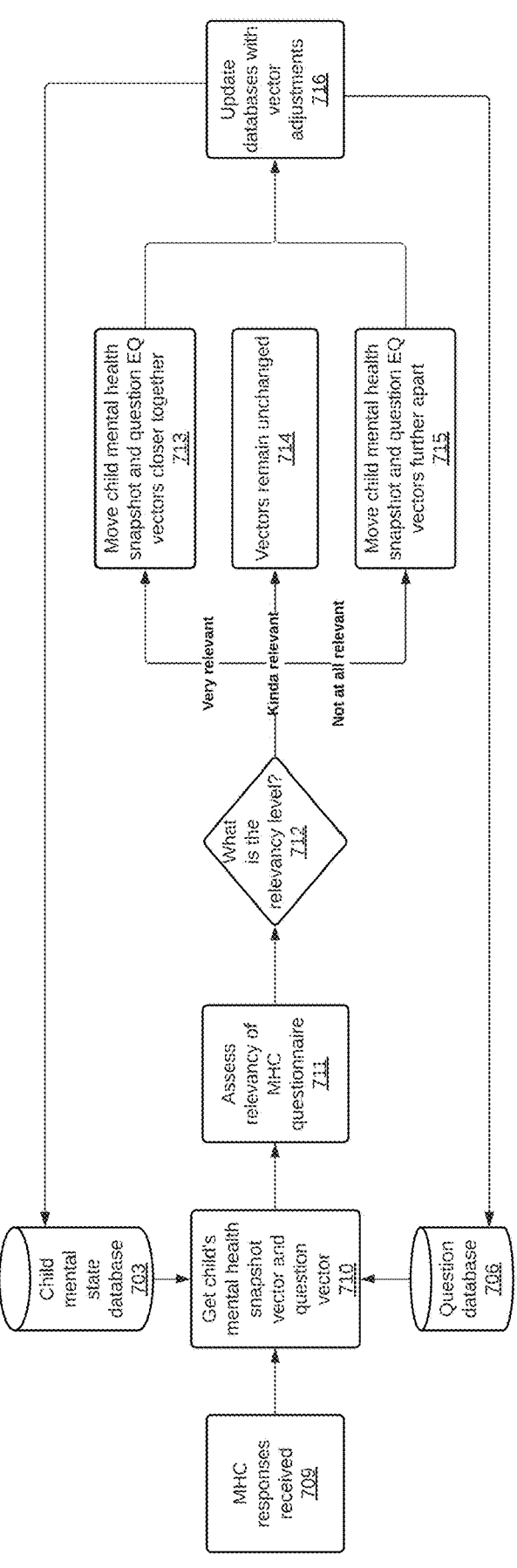

FIGS. 7A-B illustrate a method for providing mental health check questions based on a child's recent smartphone activity according to an embodiment of the present invention.

Figure 8:
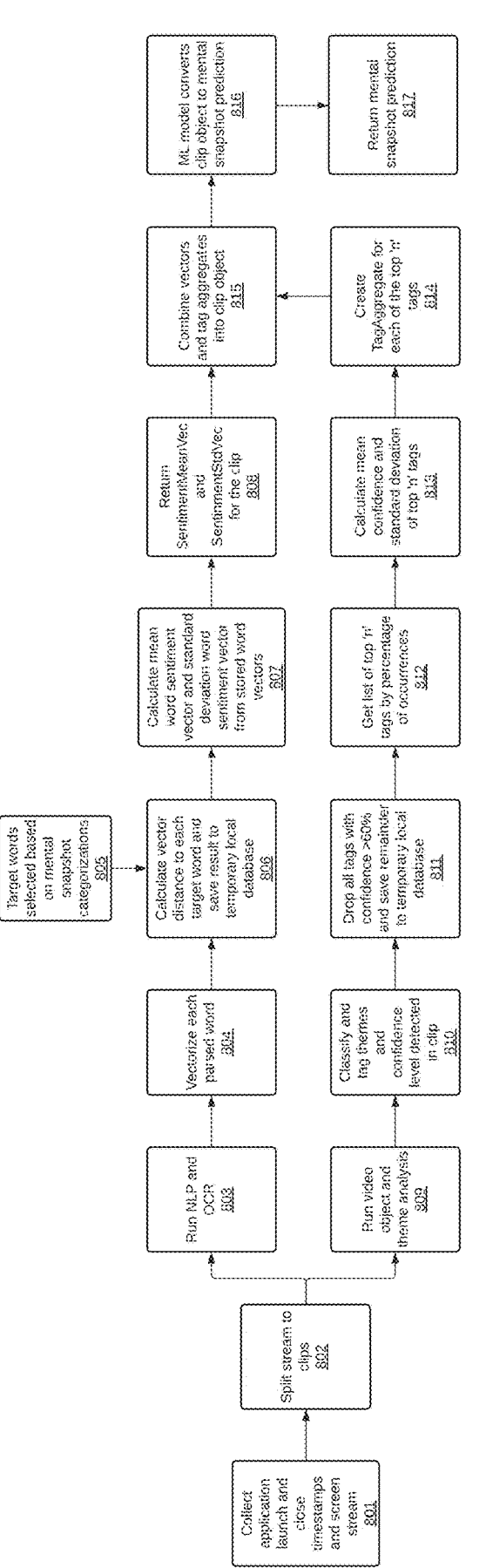

FIG. 8 illustrates a method for predicting a child's mental health state based on application usage according to an embodiment of the present invention.

Figure 9:
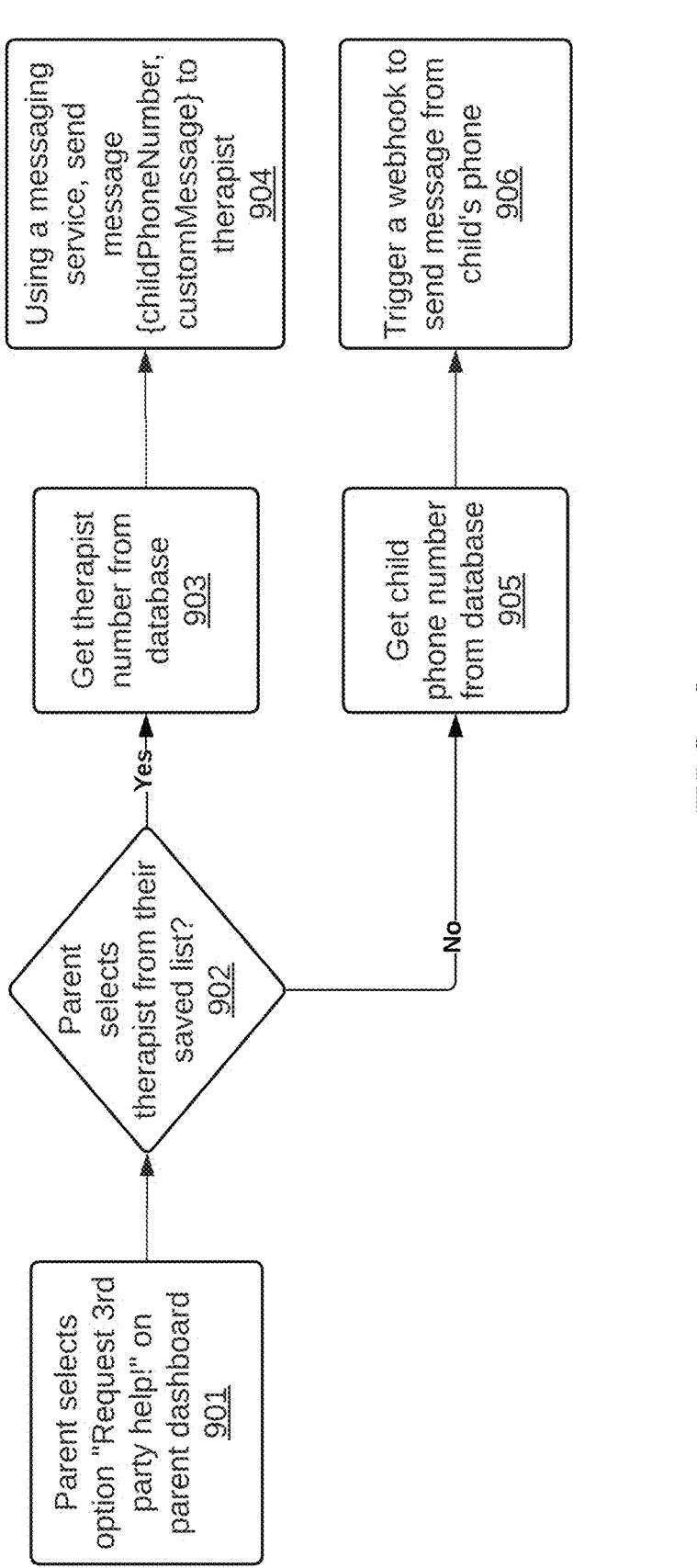

FIG. 9 illustrates a parental help requesting method from a mental health professional according to an embodiment of the present invention.

FIG. 10 illustrates a method for triggering a mental health check according to an embodiment of the present invention.

Figure 11:
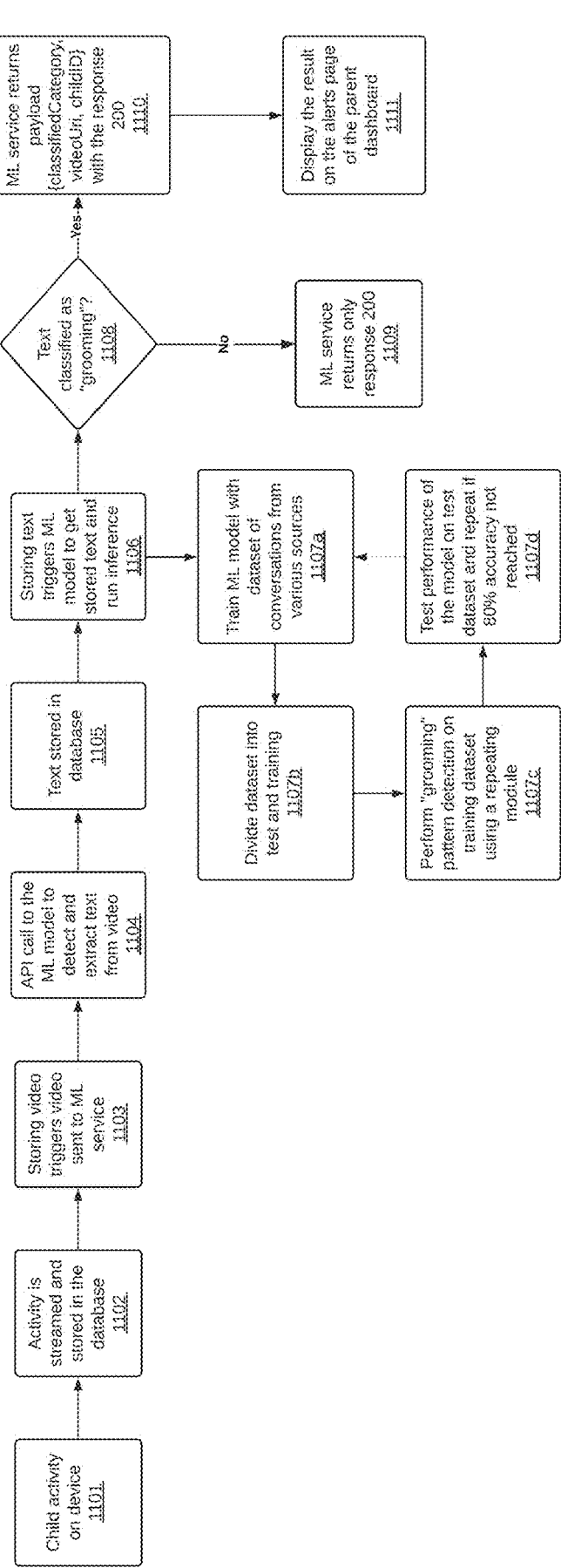

FIG. 11 illustrates a method for creating an algorithm to detect grooming patterns according to an embodiment of the present invention.

Figure 12A:
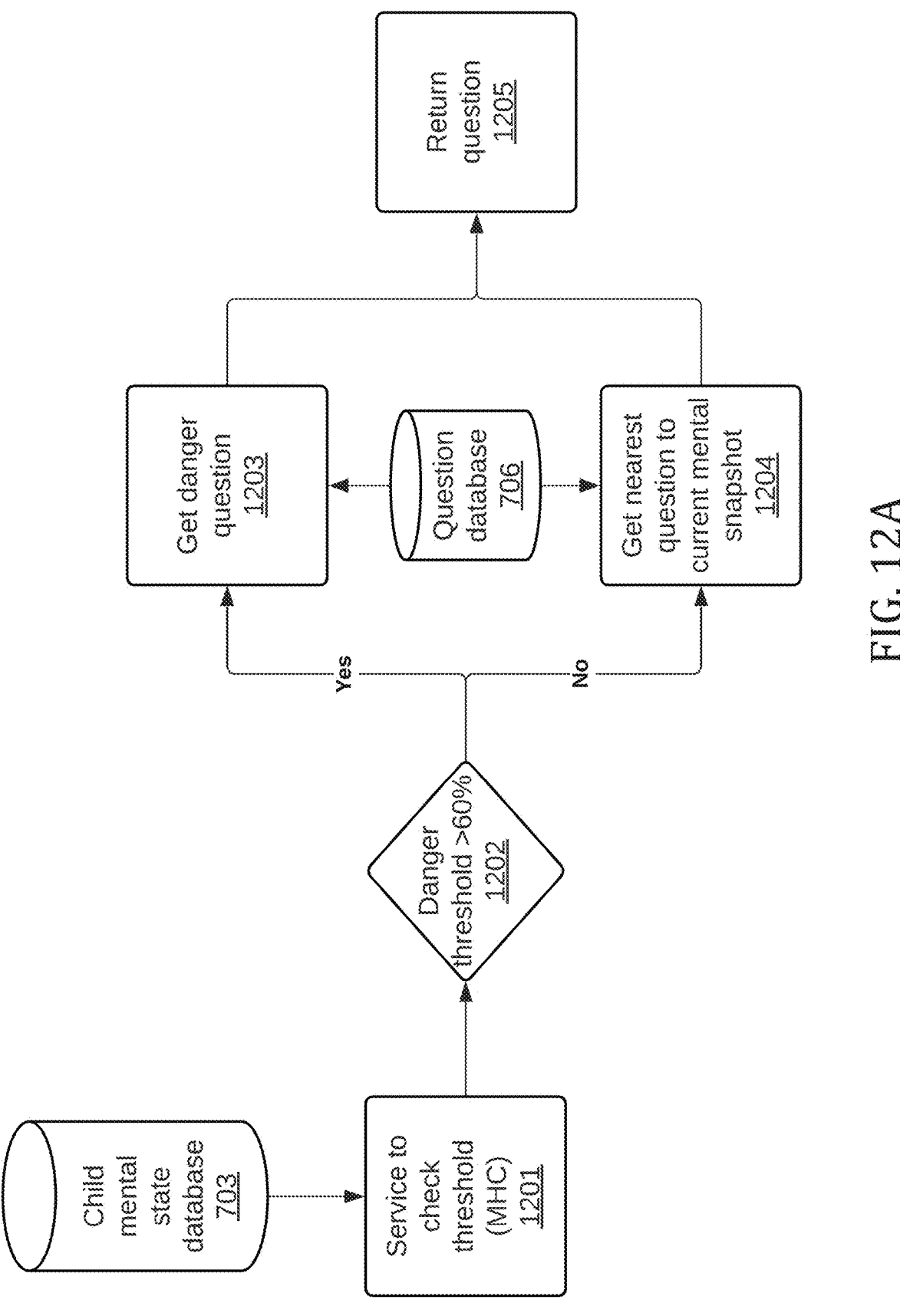
Figure 12B:
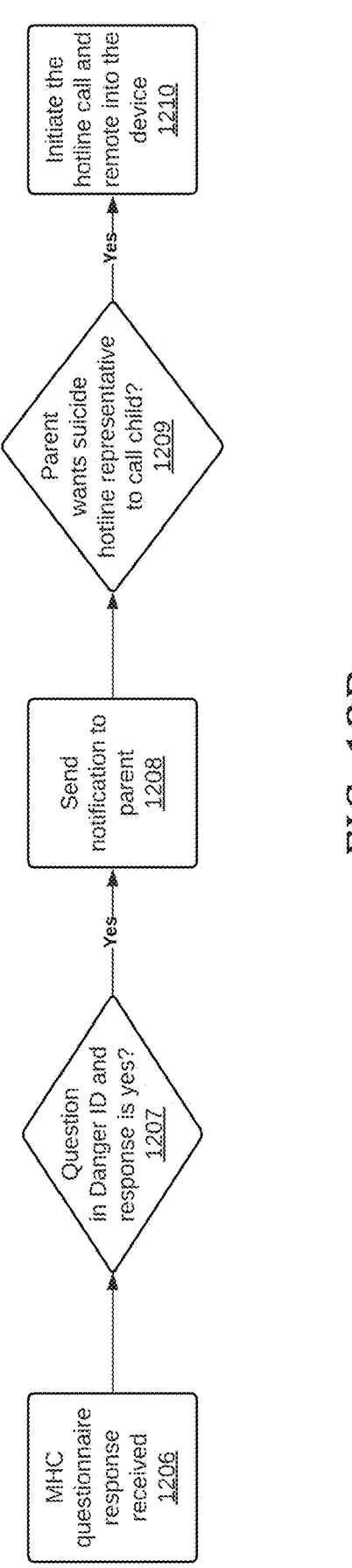

FIGS. 12A-B illustrates a method for triggering a suicide hotline call after the mental health check according to an embodiment of the present invention.

Figure 13:
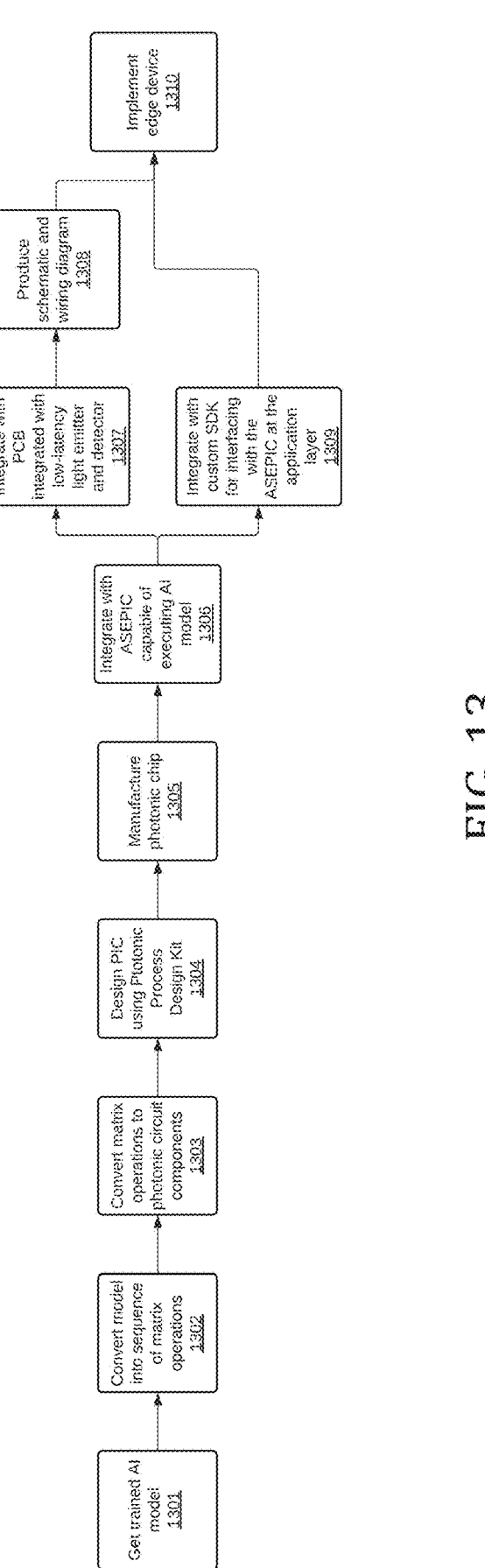

FIG. 13 illustrates a method for deploying a PIC microcontroller for edge machine learning recognition and inference according to an embodiment of the present invention.

DETAILED DESCRIPTION OF THE
INVENTION

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a system and method for smartphone restrictions and monitoring.

It is to be understood that the terminology used herein is for the purpose of describing particular embodiments only and is not intended to be limiting. The terms "a" or "an," as used herein, are defined as to mean "at least one." The term "plurality," as used herein, is defined as two or more. The term "another," as used herein, is defined as at least a second or more. The terms "including" and/or "having" as used herein, are defined as comprising (i.e., open language). The term "providing" is defined herein in its broadest sense, e.g., bringing/coming into physical existence, making available, and/or supplying to someone or something, in whole or in multiple parts at once or over a period of time. These terms generally refer to a range of numbers that one of skill in the art would consider equivalent to the recited values (i.e., having the same function or result). In many instances these terms may include numbers that are rounded to the nearest significant figure.

Figure 1:
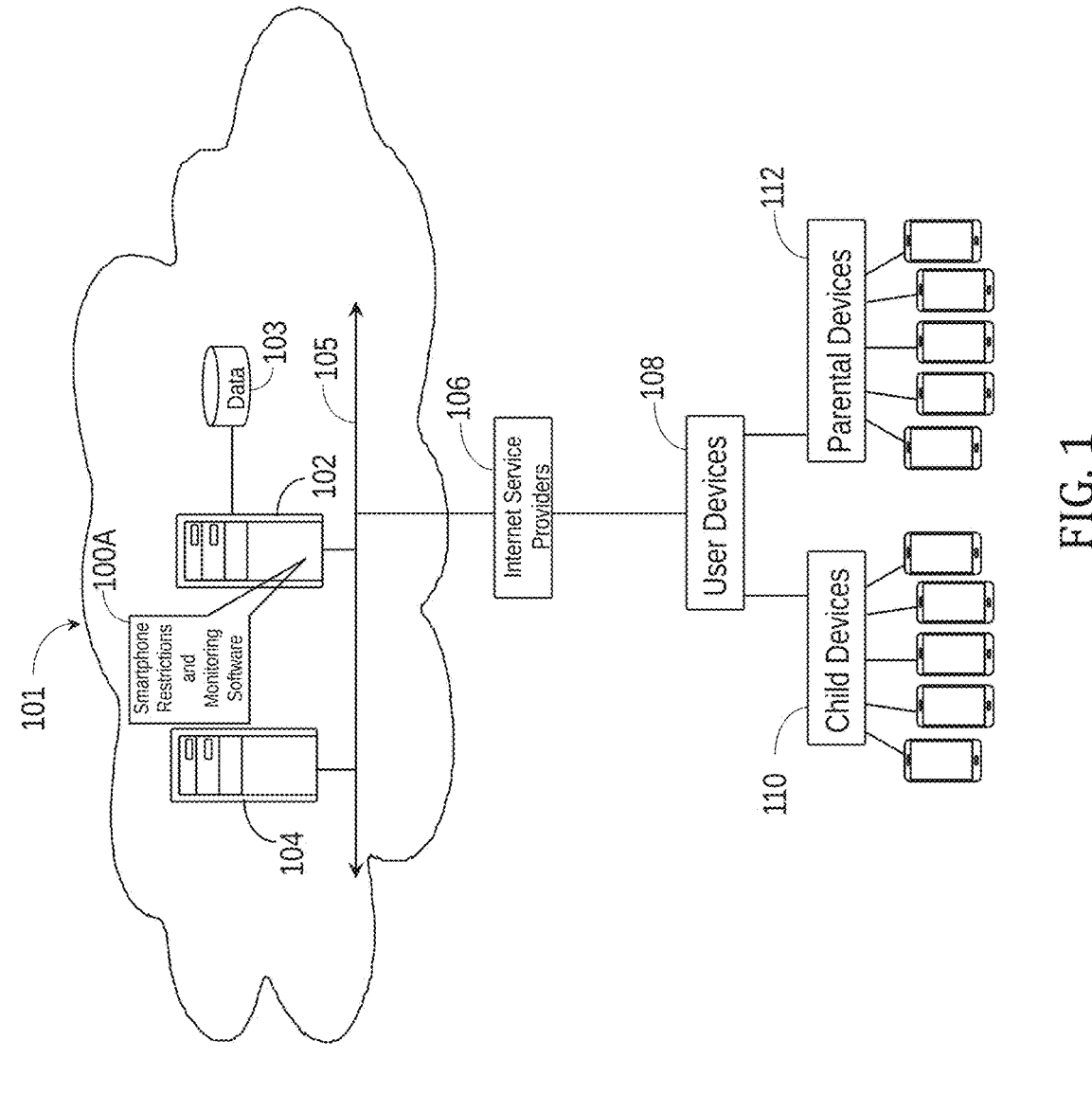
FIG. 1 is a network diagram illustrating a system for smartphone restrictions and monitoring according to an embodiment of the present invention.

FIG. 1 is a network diagram illustrating a system for smartphone restrictions and monitoring according to an embodiment of the present invention. Referring now to FIG. 1, the system comprises one or more internet-connected central servers 102 executing smartphone restrictions and monitoring software 100A from non-transitory media. A central server 102 is connected to a data repository 103, which may be any sort of data storage known in the art. The system further comprises a third party internet-connected server 104 connected to internet backbone 105. Although one third party internet-connected server 104 is shown, it is understood that potentially millions of other similar servers are connected to the internet via internet backbone 105. A number of user devices 108 are connected to the internet-connected central server 102 via an internet service provider (ISP) 106, allowing the number of user devices 108 to access the software 100A. In one embodiment, the user devices 108 comprise child devices 110 and parental devices 112. In some embodiments, parental devices may include mental health professional devices and law enforcement devices.

Figures 2, 3:
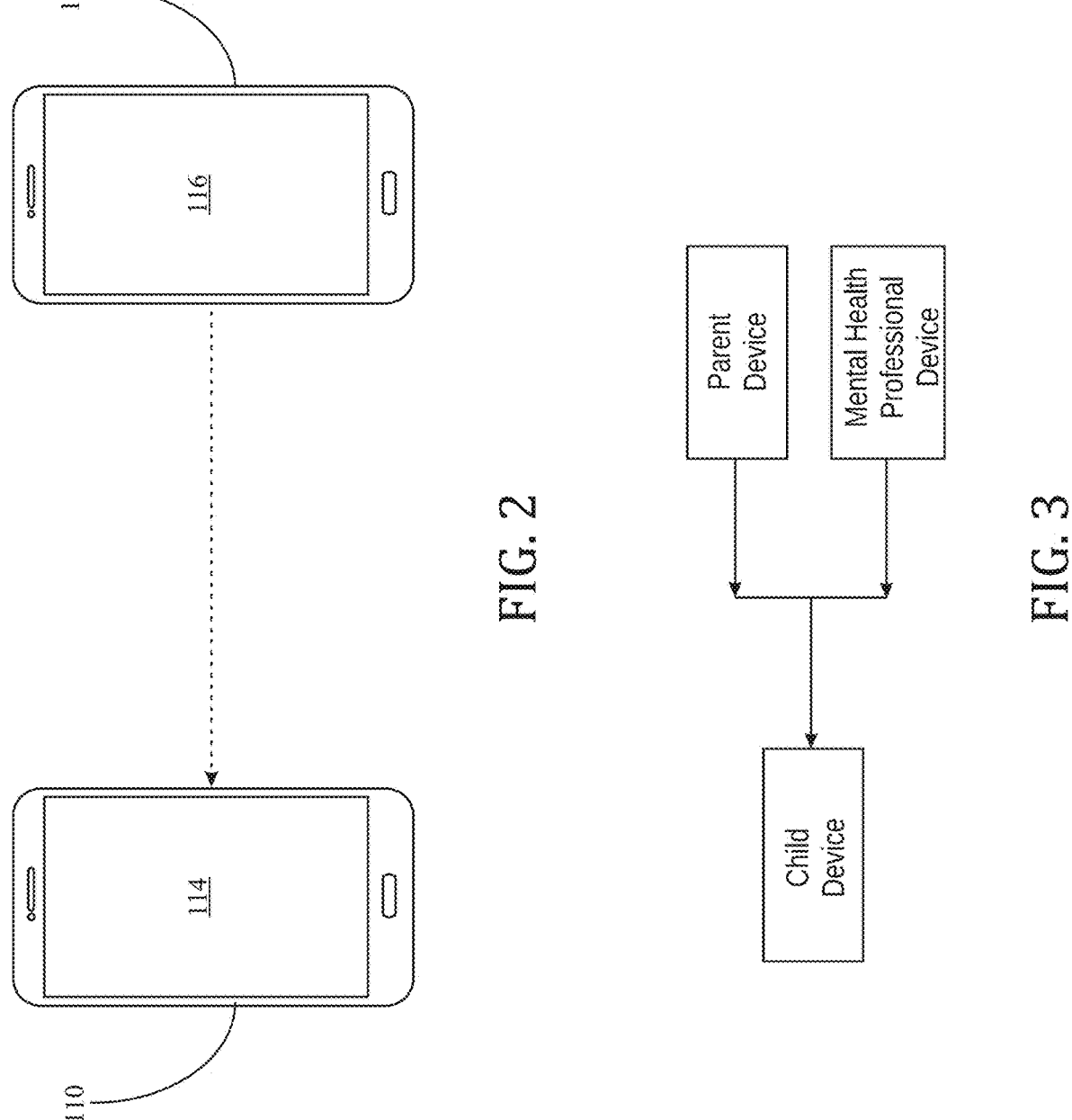
FIG. 2 is a detailed diagram illustrating screen monitoring of a child device from a parental device or mental health profession device according to an embodiment of the present invention.
FIG. 3 is a detailed network diagram illustrating monitoring of a child device from a parental device or mental health profession device according to an embodiment of the present invention.

FIG. 2 is a detailed diagram illustrating screen monitoring of a child device 110 from a parental device 112 or mental health professional device according to an embodiment of the present invention. Regarding FIG. 2, advantageously, the present invention provides a method of monitoring, in real-time or delayed time, the smartphone activity of the child device 110 via the parental device 112. The child device 110 of the present invention is a specific smartphone device preloaded with an operating system having a variety of tools to perform the present invention. A generic smartphone device can not be used for the child device 110, rather a customized device is provided specifically for the present invention. Conversely, the parental device 112 is a generic smartphone device that is configured to load and access the software (100A; FIG. 3) as well as pair to one or more child devices 110. In one embodiment, the child device 110 comprises a display device 114, a processor, data storage, random-access memory, one or more cameras on the front and rear of the device, internet and cellular connectivity, removable storage, and a customized operating system. Likewise, the parental device 112 has the components well known in the art of typical smartphone devices including a display device 116. It should be noted that all data transmitted is via known encrypted communication protocols to keep data from being leaked to non-authorized users.

FIG. 3 is a detailed network diagram illustrating monitoring of a child device from a parental device or mental health profession device according to an embodiment of the present invention. Regarding FIG. 3, the transmission or monitoring of the child device is one-way, i.e. only the parent device, mental health processional device, and/or law enforcement device (not illustrated) may monitor the child device.

In one embodiment, at all times when the child device display screen is on, the activity on the display screen is live-streamed directly to the data repository on the central server. The individual screen recording and media audio recordings are automatically categorized and correlated to each specific application of use. Advantageously, the system on the child device detects which applications are being launched and when they are opened and closed. This will be discussed in greater detail below. By capturing all the activity data of the child device, parents and mental health professionals are able to view all of the child's historical activity on the child device by viewing an archive recording video of the display screen as it was being used. Since each recording is time-stamped and categorized, the parent or mental health professional can view which apps the child was using and what exactly they were doing in the hours preceding the submitted mental health check.

Further, in some embodiments, parents and mental health professionals are able to remotely view the display screen in real-time. When logged into the central server, via a software application (100A; FIG. 1), the parents and mental health professionals are enabled to view a digital representation of a phone that would render the display screen as it is currently being used. In some embodiments, the latency of the real-time viewing is 10 seconds or less.

FIGS. 4A-B illustrates a system diagram outlining a method for overriding Android system library calls when an application is launched on a child device according to an embodiment of the invention. Referring to FIG. 4A, in step 401 a custom library model is loaded as a Shared Library (SO) file. Next in step 402, virtual system functions are created to mirror system shared library functions. In step 403, a target application is launched, wherein the target application is an app installed on the child device. In step 404, the application is loaded into the shared Object Storage. In step 405, the application virtual address space is created and mapped to an absolute addressable space. In step 406, the target application launched is detected, wherein the target application files are read from the Shared Object Storage 407. Next, in step 408, the target application virtual table is read and target shared library references are located. In step 409, the target application shared library function reference pointers are replaced with pointers to custom virtual interface functions. In step 410, the target application system calls are proxied by the custom library module. In step 411, the system calls are collected and sent to the server for analysis. Referring now to FIG. 4B, the hardware and software components of the child device are illustrated. Specifically, this enables the child device to analyze the binary byte code of a target application when the application is installed on the child device, such that the function calls and interactions between functions that comprise the application are determined. A call graph is built out of the function calls and parameters to generate a model of how the application operates. The member locations of the operating system methods used by the application to accomplish its functionality are re-routed to pass through the system software. Advantageously, it enables the system to view any input and output that comprises underlying data, IO procedures, and network calls during the application's life cycle. In some embodiments, the system software also hooks into the operating system UI APIs to record the full lifecycle of UI components and styling being rendered on the screen.

FIGS. 5A-B illustrate a system diagram describing a method for child device activity data monitoring according to an embodiment of the present invention. Referring now to FIG. 5-A, in step 501, audio and video permission to the system's APK (Android Package Kit) during onboarding is provided on the child device. It should be understood that the child device is preloaded with an Android operating system. However, one skilled in the art would appreciate that the system may be adapted for use with an alternative operating system. In step 502, a channel is created to live stream the data activity. In step 503, the channelID is stored on the database. In step 504, the channelID is sent back to the phone. Next, in step 505, the channelID is stored on the local phone's storage.

In one embodiment, when an application is open (see 506; FIG. 5B), the system APK receives an intent on the focus of the application 507. Next, in step 508, the channelID is retrieved from the local storage 508. In step 509, the phone activity is streamed to the channel. Then, in step 510, video frames and system audio are captured. In step 511, the frames and audio are projected on a virtual display, wherein the frames are stitched together to make a video with the audio aligned 512. In step 513, the payload is sent to the server. In step 514, the new payload triggers a live stream notification sent to the parent phone. Advantageously, the parent device is notified of a live stream via a number of notification methods, including but not limited to SMS, Email, or dashboard notifications, enabling the parent device user to click a link in the notification to view the live stream in step 515. Next, in 516 the parent device display is redirected to the dashboard with the video player playing the live stream.

In one embodiment, when an application is closed (see 506; FIG. 5B), the system APK receives an intent on the un-focus of the application 517. In step 518, data and metadata are sent to a server and indicate that the streaming has stopped. In 519, the streaming session is stored on the database. In step 520, the stored stream is added to the dashboard (Feed page). In another embodiment, in step 521, the stored stream is sent to the machine learning service for further analysis. Finally, in step 522, the results are made available on the machine learning content page.

As previously discussed, it is a particular advantage of the present invention that during run-time of an application on the child device, all underlying data inputs and outputs, the data passing through the network interface, and the views in the window of the child device display screen are recorded in real-time and sent directly to the central servers. In some embodiments, a sandboxed containerized operating system enables the system to "replay" the device's state as it happened by rendering the UI elements exactly how they were rendered on the device itself and mimicking the underlying data inputs and outputs to provide a session replay. The session replay is similar to the "image" of the child device at certain points in time. This image represents a byte for byte replica of the child device at certain points in time. Advantageously, even if the data is deleted by the user of the child device, the data is available for viewing by the parent device or mental health professional.

FIGS. 6A-B illustrate a system diagram for a method for triggering a mental health check via a machine learning algorithm according to an embodiment of the present invention. Advantageously, the custom software installed on the child device prior to delivery and sale to the user, wherein the software is configured to watch the application launcher API in the operating system of the child device to detect when social media applications are being launched. During periods designated as a mental health check, if any application other than the mental health check application attempts to launch, the mental health check application launches instead, taking over the full screen/display of the child device, and providing a mental health check-in for the child user. Once the questions are answered and submitted, the phone can resume normal operations.

Referring now to FIGS. 6A-B, one embodiment of a method for triggering a mental health check is provided. In step, 601 the collection of phone data procedure is triggered. In step 602, the battery percentage of the child device, foreground application name, and the current timestamp is collected. Next, the results are saved to the database for the childID 603. In step 604, the parameters for time, battery percentage, foreground application and child ID are combined into a .csv file. Next, in step 605 a machine learning (ML) algorithm is run to predict the active phone use times of the day. Next, the results are saved to the database for the childID 606. In step 607, simple queue service (SQS) triggers are created for the scheduled times to trigger mental health checks for the childID. Finally, at scheduled times, the SQS triggers the mental health checks (/healthcheck-started endpoint) for the childID 608.

In some embodiments, the ML algorithm retrieves a dataset with battery percentage and foreground application at half hour intervals 609. In 610, the dataset is divided into training and test sets. In step 611, the ML model runs forecasting on the training data 611. In step 612, the ML model performance is tested on the test dataset. If the accuracy is greater than 80%, the system moves to step 606, if not step 609 is repeated.

In one embodiment, for forecasting the ML model uses the function $EDt+1=F$ (EDt, EDt−1, EDt−2, EDt−3, . . . , error) where ED=F (battery percentage, foreground running application) where t represents the present hour, t+1 is the next hour and t−1 is the previous hour, and wherein the prediction is based on the past values of a variable. In some embodiments, when more data is introduced, the variable of age group may be added to the model to improve the predictive capability of the model.

Still referring to FIGS. 6A-B, in step 614, the system receives an intent on the application, wherein the APK starts sending activity to the server 615. In step 616, a trigger is defined on the server to detect when streaming starts, wherein on the start of the stream, the trigger sets the setTimeOut( ) function to start. In some embodiments, the setTimeOut( ) function has a defined time limit at which the mental health check is triggered 618. In step 619, the system determines if a timeout is reached. If yes, the mental health check is triggered on the child device 620. If not, the next mental health check will trigger based on the pre-defined timing schedule 621.

FIGS. 7A-B illustrates a method for providing mental health check questions based on a child's recent smartphone activity according to an embodiment of the present invention. Referring now to FIG. 7A, in step 701 the mental health questionnaire is requested. In step 702, it is determined if the child user has had a mental snapshot. If yes, then in step 704 the current mental snapshot is used, which is retrieved from the child mental state database 703. If not, then in step 705 an initial baseline mental snapshot is used. Next, in step 707, the nearest question to the current mental snapshot is retrieved from the question database 706. In step 708, the next question is returned to the questionnaire.

Referring now to FIG. 7B, next in step 709 the mental health check responses are received. In step 701, the child's mental health snapshot vector and question vector are retrieved from the child mental state database 703 and the question database 706, respectively. Next, in step 711, the relevance of the mental health check questionnaire is assessed. In step 712, the system determines the relevancy level. If very relevant, the child mental health snapshot and question EQ vectors are moved closer together 713. If kind of relevant the vectors remain unchanged 714. If not relevant, the child mental health snapshot and question EQ vectors are moved further apart 715. Finally, in step 716, the databases (703/706) are updated with the vector adjustments.

In some embodiments, the mental health responses are transmitted to the central servers, wherein mental health professionals are enabled to view the responses and real-time GPS location of the device, which is updated approximately every 10 seconds. In some embodiments, the mental health professionals are enabled to provide assistance to the child that answers the mental health check, wherein assistance is configured to be directed via SMS messaging, phone calls, or video calls directly to the child device which was the source of the responses. In some embodiments, in addition to the mental health professionals, parent devices may also view the mental health check responses from their child user and view the identity of the mental health professionals that are remotely providing assistance to their child user. In addition, in some embodiments, parents may request remote intervention from a mental health professional. The steps for this process will be discussed in greater details below.

In some embodiments, the mental health check questions are in text-based format on the child device. In some embodiments, the questions are audio (via a recorded voice) transmitted through the speakers of the child device. In yet alternative embodiments, the questions are video recordings of an individual asking the question(s). In some embodiments, the child user may select which transmission style they prefer. Likewise, the child user responses to the mental health check questions are text-based, audio recordings, or video recordings submitted by the user.

In some embodiments, the mental health check may be via an interactive method. That is, rather than the child user answering questions, the child user may be taken through a mindfulness exercise, taught breathing techniques, or be given concise explanations of topics related to social-emotional health, wherein the interactive method may take the form of animations, audio recordings, video recordings, or graphic games.

FIG. 8 illustrates a method for predicting a child's mental health state based on application usage according to an embodiment of the present invention. Referring now to FIG. 8, in step 801 the application launch and close timestamps and display stream are collected. In step 802, the stream is split into clips, wherein each clip has a start and end time, duration, sentiment vectors (standard and mean), and aggregate tags. In step 803, the natural language processing (NLP) and optical character recognition (OCR) is run, wherein each parsed word is vectorized 804. In some embodiments, target words are selected based on mental snapshot categorizations 805, wherein the vector distance to each target word is calculated and saved to a temporary local database 806. Next, in step 807, the mean word sentiment vector is calculated from stored word vectors. In step 808, the standard and mean sentiment vectors are returned for each clip.

Simultaneously, after step 802, the video object and theme analysis is run, wherein the tagged themes are classified and confidence level detected for each clip is provided 810. For example, tag (ID), confidence level (%), and timestamp (time) are determined. Next, in step 811, all tags with a confidence level below 60% are deleted/dropped and the rest are saved to the temporary local database. Next, in step 812, a list is provided of the top 'n' tags arranged by percentage of occurrences and the mean confidence and standard deviation of the top tags are calculated 813. For example, happy (value), depressed (value), violent (value), and similar sentiment vectors are used. The exact target words used are based on mental snapshot categorizations. Next, in step 814, the tag aggregates are created for the top 'n' tags.

Next in steps 815 and 816, after steps 808 and 814, the tag aggregates and vectors are combined and the clip objects are converted into a mental snapshot prediction via the ML model. Finally, in step 817, the mental snapshot prediction is returned for use in the system for mental health check processes.

FIG. 9 illustrates a method for a parent to request help from a mental health professional according to an embodiment of the present invention. Referring now to FIG. 9, in step 901, the parent user on the parent device selects, via clicking or other means the option to "Request 3rd party help!" on the parent dashboard. As previously discussed, during sign-up the parent user creates an account to access a parent dashboard which also enables the parent to be linked to one or more child devices or child users. After selecting help, in step 902, the parent selects a therapist from a previously-saved list, or a therapist from a mental health hotline. At any time, a parent may add a new therapist or helpline by adding the content with identification information, phone number, name, and address which may be saved to the database for future use. If the parent selects a previously saved therapist, the phone number for the selected therapist is retrieved from the database 903. Then in step 904, a message is sent to the therapist to contact the child user via the child's device. If the parent requests a new therapist, i.e. the mental health hotline, the child's phone number is retrieved from the database in step 905 and a webhook is triggered to send a message from the child's device to the therapist from the hotline in step 906.

FIG. 10 illustrates a method for conducting a mental health check after the mental health check is triggered, according to an embodiment of the present invention. The mental health check is triggered in step 1001, and the questions database (see 706; FIG. 7A) is queried for the next question and at the same time, the category is randomly selected between audio, augmented reality (AR) and virtual reality (VR) in step 1002. If audio is selected, the APK on the child device displays a screen which plays the question in audio in step 1003. Next, in step 1004, the child clicks the "Record" button on the display and records an answer to the question. In step 1005, once the answer is successfully recorded, the "Next" button is enabled, and the child clicks the "Next" button in step 1006, which prompts a new question to be given in audio format again in step 1003 and the loop continues until the MHC is completed. The recorded audio of the child's answer is stored in the database on the server in step 1007. When the new recording reaches the database, a back-end service is triggered which sends the recording to the ML service in step 1008. In the next step, 1009, the ML service converts the audio clip into .wav format. An ML model is trained with the data from the dataset of .wav files created to detect emotions from audio clips in step 1010a. First, the dataset is split into a training set and a testing set in 1010b. Then, in step 1010c, a custom model is used to classify based on the training set. Finally, in step 1010d, the model performance is determined by running the model on the test set and if the performance targets are not met, the process is re-run beginning at step 1010a. Model performance parameters may include accuracy, precision, recall and F1 score. For the current .wav file recorded from the current child answer, in step 1011, the .wav file undergoes signal processing to transform the time-domain signal to the frequency-domain signal to create a spectrogram. In step 1012, feature extraction is done on the spectrogram. Finally, in step 1013, the ML classification model is used to classify the emotion of the child. In this step, the classification model uses criteria to identify the relationship between dependent and independent variables including reduction in variance, entropy and chi-square test.

In some embodiments, to improve the ML model, a partnership with mental health professionals and adolescents currently diagnosed with underlying mental health conditions is provided. These adolescents are provided a device and data is collected about their social media use in real-time along with their mental health check-in responses. This data is combined with the data drawn from scholarly studies on types of social media activities that correlate to specific mental health conditions for training custom ML prediction models, which enable the ML model to predict the current mental state and the short-term future mental state based on the social media activity and the recent mental health check responses.

In some embodiments, as data events are streamed from the child device, all the activity passes through the ML prediction model, wherein the algorithm predicts the most effective mental health check to send to the child device. For example, the algorithm knows that the child device is being used by a 12-year old female user. It receives data for the past 3 hours showing that the female user is focused on Instagram photos and TikTok videos of female models. The algorithm model predicts that the female user could likely be comparing her own body image to what she is viewing and the model generates a custom mental health check-in based on this data.

Still referring to FIG. 10, if AR is selected in step 1002, the system's AR SDK is triggered and the child device camera opens in step 1014. Next, in step 1015, the in-built AR model detects the child's face. The process flow then splits based on the randomly chosen question type in step 1016. For a video recording question, in step 1017, the child answers the question using recorded video with the option to select video effects or filters. After recording, the child clicks the "Submit" button and the recorded videos are sent to the database on the server in step 1018. Finally, an API call is triggered to get the new data and display the child's answer on the dashboard of the parent's device in step 1019. If the question type is multiple choice in step 1016, the SDK uses gesture APIs which enables the child to select answers using gestures in step 1020. In step 1021, the answer data is sent to the database on the server, and step 1019 is reached again in which an API call is triggered to display the child's answer on the dashboard of the parent's device.

Again referring to FIG. 10, if VR is selected in step 1002, the system's VR APK is triggered and the MHC questions are displayed on a headgear device for the child. The APK is built using SDKs of the selected headset, Android classes and API methods to detect gestures. In step 1023, the child then answers the question using gestures to select an answer. In step 1024, the child submits all answers with a gesture and the data is sent to the database on the server. Lastly, step 1019 is reached again and an API call is triggered to display the child's answers on the dashboard of the parent's device.

FIG. 11 illustrates a method for creating an algorithm to detect grooming patterns according to an embodiment of the present invention. Referring now to FIG. 11, in steps 1101-1102, the child activity on the device is streamed and stored into the database. Next, storing the video triggers the ML service to receive the saved video 1103. Next, in step 1104, an API call is made to the ML model to detect and extract text from the video, wherein the text is stored in the database 1105. Upon storing the text, the ML model is triggered to get the stored text and run inference 1106. From this text, in step 1107a, the ML model is trained on the dataset of conversations collected from various sources, including but not limited to, national data archives, chat room conversations published by foundations fighting cyber violence, and similar organizations. In step 1107b, the dataset is divided into test and training. In 1107c, "grooming" patterns are detected on the training dataset using a repeating module. In one embodiment, the repeating module has interacting layers communicating with each other. The sigmoid function is used to store important past information, with weights added. Then, one layer is used to send the output. The performance of the model of the test performance is repeated until the desired accuracy of 80% is reached in step 1107d.

In some embodiments, the system checks the classification of text in terms of grooming 1108. If the text is grooming, in step 1110, the ML service returns the payload {classifiedCategory, videoUri, childID} with the response 200, i.e OK status code. Then in step 1111, the results are displayed on the alerts page of the parent dashboard. If the text is not grooming, in step 1109, the ML service returns only response 200.

As well known in the art, grooming is a form of abuse. It is usually in the form of manipulative behaviors in which the abuser gains access to the child by forming a relationship, coerces them to agree to the abuse so that they can manipulate them into doing things, and uses threats to reduce the risk of being caught. It may be sexual in nature, financial, or other illegal acts. Advantageously, the ML model of the present invention will identify these grooming patterns prior to any emotional harm on the child user.

FIGS. 12A-B illustrates a method for triggering a suicide hotline call after the mental health check according to an embodiment of the present invention. Advantageously, the ML prediction algorithm identifies activity on the child device that may suggest imminent danger or harm, including but not limited to violence, suicide, etc., wherein the mental health professionals are configured to receive notifications to initiate direct intervention. This will be described in further details below.

Referring now to FIGS. 12A-B, in step 1201 a service to check the mental health check threshold is provided, which is retrieved from the child mental state database 703. Next, in step 1202, the danger status is determined. In one embodiment, the danger threshold is 60%. If the danger level is greater than 60%, a danger question is provided in step 1203, wherein the danger question is retrieved from the question database 706. If the danger threshold is less than 60%, the nearest question to the current mental snapshot is provided in step 1204. Next, in step 1205, the appropriate question is returned to the child device. Once the child user responds to the question, the system receives the response in 1206. If it is determined the child user is in danger 1207, a notification is sent to the parent in step 1208. Next, the parent may request a hotline representative to call the child 1209. If requested, the hotline call is initiated in step 1210.

In some embodiments, law enforcement first responders have an additional remote server in communication with the central service, enabling the law enforcement first responders to view anonymized feeds of activity categorized by geographic area. If law enforcement first responders identify activity that could indicate imminent danger, they can request access. If the access is approved by the parent or a mental health professional, the law enforcement first responder would be granted temporary access to the same functionally that the parent has, e.g. real-time GPS, live stream of the child device display in real-time, viewing history of social media activity, as well as past mental health check results. Further, if a mental health professional identifies that activity on the feed is worrisome, they can directly escalate to provide a law enforcement intervention enabling the law enforcement user real-time location and parental device access. Likewise, if a parent views anonymous activity on the public feed that appears worrisome, they can initiate a review request that is sent to a mental health professional, wherein the mental health professional can decide to intervene or escalate the situation to a law enforcement first responder. The public feed enables a community of parents and mental health professionals access to a remote server in communication with the central server, wherein the public feed provides anonymous mental health check responses from the child users and summaries of recent social media activity to the parents. However, mental health professionals are able to see attributable information for all child users.

FIG. 13 illustrates a method for deploying a photonic integrated circuit (PIC) microcontroller for edge machine learning recognition and inference according to an embodiment of the present invention. In order to have an effective ML model the use of edge computing is provided. Referring to FIG. 13, a trained AI model is provided 1301. Next, in 1302, the AI model is converted into a sequence of matrix operations, and in step 1303 the matrix operation is converted to photonic circuit components, including but not limited to amplifier, phase modulator, pol converter, and waveguide. Next, in step 1304, a PIC is designed using a photonic process design kit, which enables the manufacturing of a photonic chip in step 1305. In step 1306, the photonic chip is integrated in an ASEPIC (application specific electronic and photonic integrated circuit) capable of executing the AI model. Next, in step 1307, the PCB is integrated with a low-latency light emitter and detector. In step 1308, a schematic and wiring diagram is produced. Also, a custom SDK is provided in step 1309 to be integrated with the ASEPIC at the application layer. Finally, the PIC is implemented into an edge computing device of the system in step 1310.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternative embodiments are contemplated, and can be made without departing from the spirit and scope of the invention.

It should further be noted that throughout the entire disclosure, the labels such as left, right, front, back, top, bottom, forward, reverse, clockwise, counterclockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, references to "first," "second," "third," and etc. members throughout the disclosure (and in particular, claims) are not used to show a serial or numerical limitation but instead are used to distinguish or identify the various members of the group.

What is claimed is:

1. A method for monitoring smartphone usage among children, comprising:

providing, via a child device provider, a specialized child device with a pre-installed customized operating system and monitoring software prior to delivery to a user, wherein the pre-installed customized operating system includes a custom library model configured to be loaded as a shared library file within the operating system of the child device, to create virtual system functions that mirror actual system shared library functions used by applications running on the child device, and to intercept and log activity data including inputs, outputs, and system calls associated with the applications;

transmitting, via the specialized child device, the activity data from the child device to a central server;

analyzing, via the central server, the activity data on the central server to identify usage patterns;

generating, via the central server, notifications based on the analyzed usage patterns;

sending, via the central server, the notifications to a parental device; and, enabling, via the central server, the parental device to access and review the notifications and the activity data of the child device through a parental dashboard configured on the parental device.

2. The method of claim 1, wherein the transmitting data includes information selected from the group consisting of application usage data, call data, message data, and internet browsing data.

3. The method of claim 1, wherein the analyzing step includes the use of a machine learning algorithm to determine the usage patterns.

4. The method of claim 1, further comprising triggering a mental health check based on the analyzed usage patterns.

5. The method of claim 4, wherein the mental health check includes sending a questionnaire to the child device.

6. The method of claim 5, wherein the questionnaire is adapted based on the child's recent activity as determined by the machine learning algorithm.

7. The method of claim 1, further comprising the step of live streaming the display of the child device to the parental device.

8. The method of claim 1, wherein the notifications are based on predetermined criteria including at least one of: time spent on applications, inappropriate content access, and time of device usage.

9. The method of claim 1, further comprising a mental health professional device configured to receive specific alerts and data related to mental health checks from the central server.

10. The method of claim 9, wherein all streaming data is stored in a categorized database on the central server for non-real-time access by the parental or mental health professional device.

11. The method of claim 1, further comprising a mechanism for law enforcement first responders to access data and receive alerts from the central server when a predetermined danger threshold is exceeded.

12. The method of claim 1, wherein the custom library model file, is configured for detecting application launches and closures by monitoring the application's execution state, and logging these events along with associated data traffic and system call activities to provide detailed insights into application usage patterns.

13. The method of claim 1, further including a feature for detecting grooming patterns based on the stored data using a machine learning model, and alerting the parental device.

14. The method of claim 13, further comprising:

analyzing the logged data using a machine learning model configured to identify specific behavioral patterns and indicators of grooming;

applying natural language processing (NLP) techniques to the content within the communications and interactions logged from the child device to enhance detection accuracy;

automatically updating the machine learning model based on new data inputs to refine the pattern recognition process over time; and, generating and transmitting alerts to the parental device when potential grooming behavior is detected, including detailed information on the context and nature of the detected activity to assist in timely and appropriate responses.

* * * * *